A. H. FRANKE.
COMBINATION SEAT AND WALKING CANE.
APPLICATION FILED DEC. 24, 1915.
1,187,297.
Patented June 13, 1916.
2 SHEETS—SHEET 2.
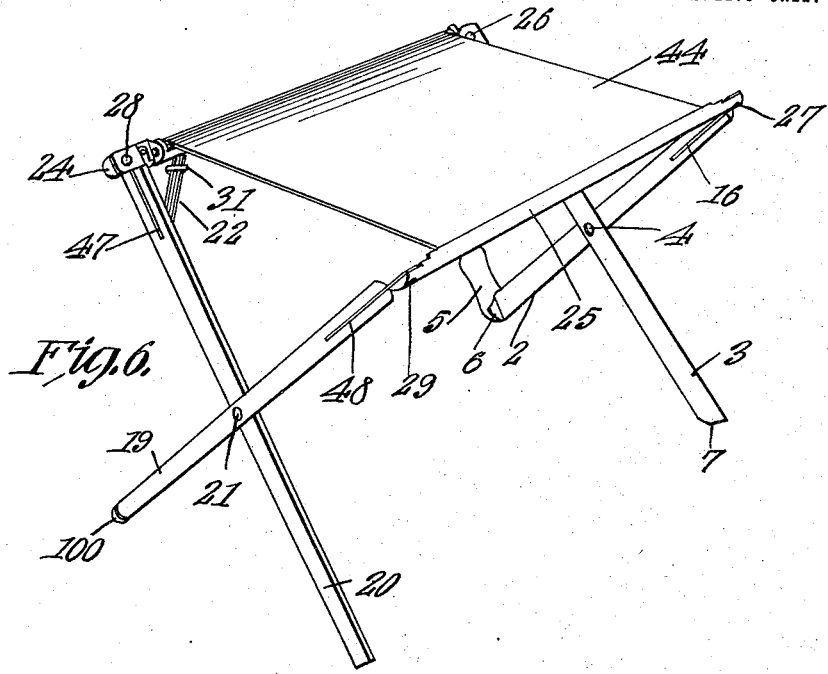
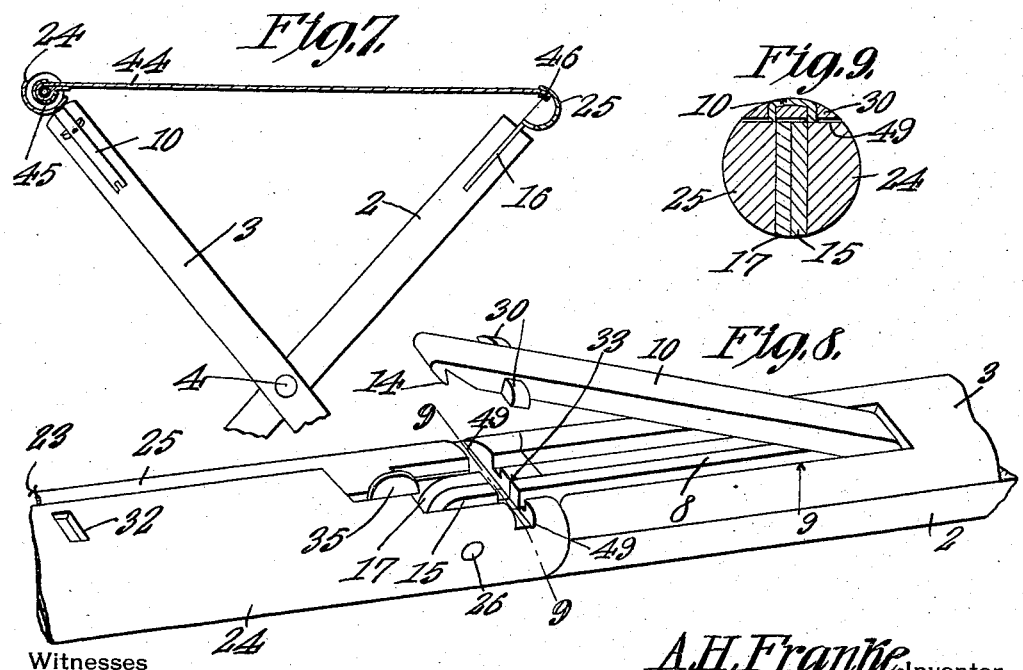
A. H. Franke, Inventor

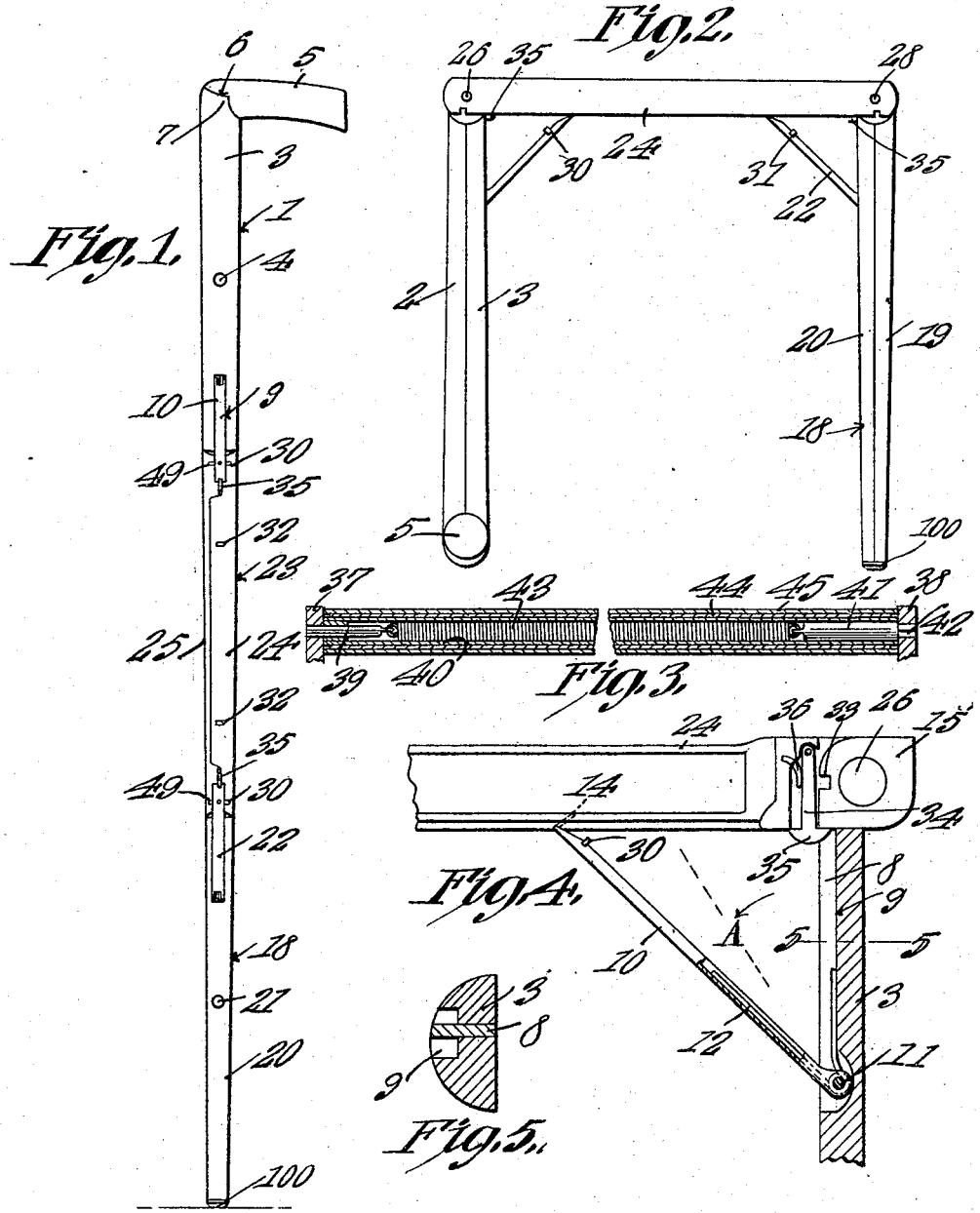

UNITED STATES PATENT OFFICE.

ARTHUR H. FRANKE, OF MANITOWOC, WISCONSIN.

COMBINATION SEAT AND WALKING-CANE.

1,187,297.　　　　　Specification of Letters Patent.　Patented June 13, 1916.

Application filed December 24, 1915. Serial No. 68,549.

*To all whom it may concern:*

Be it known that I, ARTHUR H. FRANKE, a citizen of the United States, residing at Manitowoc, in the county of Manitowoc and State of Wisconsin, have invented a new and useful Combination Seat and Walking-Cane, of which the following is a specification.

The device forming the subject matter of this application is a portable stool, adapted to be disposed, at the will of an operator, in the form of a walking cane.

Broadly considered, the invention aims to provide a seat which may be folded so as to occupy but little space when not in use, the structure being light in weight, so that it may be carried about readily, the device being opened easily and being closed easily and the structure being such that none of the useful functions of a stool or of a walking cane are in anywise impaired.

Another object of the invention is to provide a device of the type above mentioned in which a flexible element, constituting the seat proper, is housed in an element which forms the intermediate portion of the structure when the same is in use as a cane, the handle section of the cane and the foot section therefor comprising parts adapted to be spread apart to form the legs of the structure when the same is used as a stool.

A further object of the invention is to provide elements which serve as braces between the legs and the seat carrying elements, when the structure is used as a stool, these same elements constituting auxiliary but not mandatory means for preventing relative movement between the constituent members of the device when the same is used as a cane, thereby to maintain the said members rigidly in axial alinement.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—Figure 1 shows the structure in elevation, in the position it will assume when in use as a walking cane; Fig. 2 shows the structure in side elevation, set up in the form of a stool; Fig. 3 is a longitudinal section of that part of the device which supports the seat controlling roller; Fig. 4 is a fragmental sectional view illustrating a portion of the structure as the same will appear when set up for use as a stool; Fig. 5 is a cross section on the line 5—5 of Fig. 4; Fig. 6 shows the device forming the subject matter of this application arranged for use as a stool; Fig. 7 is a section of the structure when set up as shown in Fig. 6, most parts appearing in elevation; Fig. 8 is a perspective detail; Fig. 9 is a transverse section taken approximately on the line 9—9 of Fig. 8, the brace being closed down.

The device forming the subject matter of this application includes a handle section which is denoted generally by the numeral 1, the same comprising coöperating parts 2 and 3, each of which preferably is approximately semicircular in cross section. The parts 2 and 3 of the handle sections 1 are united intermediate their ends by a pivot element 4, the construction being such that the parts 2 and 3 may be sprawled apart as shown in Fig. 6, to form the legs at one end of the stool. The handle forming part 2 is provided with an offstanding grip 5 having a shoulder 6 against which the end 7 of the handle forming part 3 abuts when the device is used as a cane, as shown in Fig. 1.

As shown best in Figs. 4 and 5 a plate 8 is inserted into the end of the handle forming part 3 and is secured thereto. In the outer face of the handle forming part 3 there is fashioned a longitudinal groove 9 into which one edge of the plate 8 projects. A brace 10 is pivoted as shown at 11 to the plate 8, the brace preferably being trough-shaped in cross section. The free end of the brace 10 is provided with a finger 14 and adjacent the finger 14, the brace is provided with lateral fingers 30. Engaged with the pivot element 11 is a spring 12, one arm of which bears against the handle part 3 at the base of the groove 9 and is fastened to the plate 8, the other arm of which bears against the brace 10 and is fastened thereto. This spring 12 tends to swing the brace 10 outwardly, in the direction of the arrow A in Fig. 4. By the time that the brace 10 has arrived approximately at the position indicated by a dash line in Fig. 4, the strength of the spring 12 will have been exhausted, so far as is concerned its ability to swing the brace 10 in the direction of the arrow A. If the brace 10 is swung in the direction of the arrow A beyond the dash line above referred to, the spring 12 reacts on the brace 10 to swing the brace 10 in a direction opposite to that indicated by the arrow A. The function of this particular portion of the device will be made manifest hereinafter. The plate 8 projects beyond the end of the part 3 to form a pivoting head 15.

The part 2 of the handle section 1 carries a plate 16 resembling the plate 8 and terminates in a projecting pivoting head 17, corresponding to the head 15. It may now be observed referring to Fig. 8, that the trough-shaped brace 10 is adapted to straddle the heads 15 and 17 when folded into the notch 9, thereby to hold the parts 2 and 3 from spreading apart and in alinement. The plate 16 does not carry a brace of the sort shown at 10.

The invention comprises a foot section 18 made up of parts 19 and 20 each of approximately semi-circular cross section, the parts 19 and 20 being united intermediate their ends by a pivot element 21, and the construction being such that, as shown in Fig. 6, the parts 19 and 20 may form the legs at one end of the stool. The part 20 carries a plate 47, corresponding to the plate 8, and a brace 22 is pivoted thereto, the brace 22 being constructed like the brace 10 and being provided with lateral fingers 31 corresponding to the fingers 30 on the brace 10. The foot forming part 19 carries a terminal plate 48 corresponding to the plate 16 and clearly shown in Fig. 6. The element 19 carries a tip 100 coöperating with the end of the part 20 to prevent the entrance of dirt when the device is in the form of a cane.

The structure comprises an intermediate section 23 made up of two trough-shaped parts 24 and 25 adapted to coöperate to form a tube. A pivot element 26 unites the head 15 of the plate 8 with the part 24 of the intermediate section and thus the part 24 of the intermediate section is pivotally assembled with the part 3 of the handle section. A pivot element 27 unites the plate 16 of the handle forming part 2 with the part 25 of the intermediate section. A pivot element 28 unites the plate 47 of the foot forming part 20 with the part 24 of the intermediate section. A pivot element 29 unites the plate 48 of the foot forming part 19 with the member 25 which constitutes a portion of the intermediate section 23.

As shown in Figs. 1 and 8, the part 24 of the intermediate section 23 is provided with openings 32 adapted to receive the fingers 14 on the braces 10 and 22 when the structure is set up in the form of a stool as shown in Figs. 2, 6 and 7. The protruding ends of the plates 8, 16, 47 and 48 of which the head 15 on the plate 8 may be taken as typical (see Fig. 4), are provided with notches 33 (Fig. 8). When the handle section 1, the intermediate section 23 and the foot section 18 are in alinement, as shown in Fig. 1, these notches 33 are lined up transversely of the cane, (see particularly Fig. 8) with notches 49 formed in the intermediate members 24 and 25. The notches 33 and 49 when thus lined up receive the fingers 30 and 31 on the braces 10 and 22 respectively, when the braces are in closed position as shown in Fig. 1. Latches 34 extend transversely of the intermediate member 24 near to the ends thereof, and are pivoted thereto, the latches terminating in heads 35. Springs 36 assembled with the member 24 coact with the latches 34 and tend to swing the same inwardly. The latches 34 coact with the movable ends of the braces 10 and 22, to hold the same against the sides of the cane, as shown in Fig. 1. (See Fig. 8.)

Near to its ends, the intermediate member 24 is provided with heads 37 and 38 which constitute supports for a spring actuated roller controlling the seat 44. Owing to the fact that a device of this sort cannot be characterized patentably by any kind of a spring actuated roller, and since many forms of rollers may be employed with advantage, the description of the roller may be taken as illustrative rather than mandatory. In one embodiment of the invention, however, a spindle 39 is journaled for rotation in the head 37 and is secured to one end of a tubular roller 40. The other end of the roller 40 is mounted to rotate on the spindle 41, the end 42 of which is engaged against rotation with the head 38. The seat 44 is looped around the roller 40 and sewed together. One end of a torsional spring 43 is secured to the spindle 41, the other end of the torsional spring being secured to the spindle 39. Extended around the roller 40 is a longitudinally slit resilient sleeve 45 constituting means for securing to the roller the looped end of the seat 44, hereinbefore mentioned, the seat 44 being flexible and preferably being made of textile material. A clamp strip 46 binds one end of the flexible seat 44 to the intermediate member 25.

Let it be supposed that the structure is arranged for use as a cane, as shown in Fig. 1, then the coöperation between the various parts is as follows: The handle section 1, the intermediate section 23 and the foot section 18 are in alinement, the constituent parts 24 and 25 of the intermediate section being closed together to form a tube. The seat 44 is wound on the roller 40 and is inclosed within the tube above alluded to.

The braces 10 and 22 lie in the grooves 9, the fingers 30 and 31 lying in the alined notches 33 and 39. The heads 35 of the latches 34 engage with the free ends of the braces 10 and 22 and hold the same on the intermediate section 23, the sections 1, 18 and 23 being held securely in alinement to form a substantial walking cane, as shown in Fig. 1.

Suppose that it is desired to arrange the structure for use as a stool, as shown in Fig. 6. Then the operation is as follows:— The latches 34 are disengaged from the braces 10 and 22, whereupon the braces will swing outwardly into the positions shown by the dash line in Fig. 4. The handle section 1 and the foot section 18 then are swung toward each other until they approach parallelism as indicated in Fig. 2. However, before the sections 1 and 18 are in parallelism, the fingers 14 on the braces 10 and 22 engage the under surface of the intermediate part 24. As the sections 1 and 18 are moved into parallelism the fingers 14 ride along the under face of the part 24 toward the openings 32 and ultimately engage therein. By this operation, the springs 12 are put under tension and serve to hold the fingers 14 interlocked with the openings 32 in the intermediate member 24. The braces 10 and 22 now are so interengaged with the parts 3—24—20 that the parts 3 and 20 will be maintained at right angles to the part 24.

The intermediate parts 24 and 25 are now separated laterally, the elements 2 and 3 swinging on the pivot element 4 and the elements 19 and 20 swinging on the pivot element 21. When the intermediate parts 24 and 25 are separated, the seat 44 will be spread out as shown in Fig. 6 and the spring 43 being put under tension by the rotation of the roller 40 through the instrumentality of the seat 44.

The operation of restoring the structure from the condition shown in Fig. 6 to the condition shown in Fig. 1 will be understood readily from the foregoing, but it may be stated, briefly, that to carry out this operation, the parts 24 and 25 are brought together to form a tube within which the seat 44 is housed, the parts 19 and 20 are brought into alinement with each other, the parts 2 and 3 are brought into alinement with each other and finally, the handle section, comprising the parts 2 and 3 and the foot section comprising the parts 19 and 20 are swung into axial alinement with the intermediate section 23 comprising the parts 24 and 25, the braces 10 and 22 being restored to the positions of Fig. 1.

Since the leg parts 2 and 3 are crossed and the pivot element 4 is at right angles to such pivot elements as 26 and 27, and since the leg parts 19 and 20 are crossed and the pivot element 21 is at right angles to the pivot elements 28 and 29, the crossed parts 2 and 3 and the crossed parts 19 and 20 will not swing laterally and permit the stool to collapse. The braces 10 and 22 and the shoulders provided near each end of the parts 24 and 25, against which the parts 8, 16, 47 and 48 abut, further strengthen and brace the structure when used as a stool. (See 51 Fig. 4, which may be taken as typical.)

Having thus described the invention, what is claimed is:—

1. A combined walking cane and stool embodying a handle section made up of crossed pivotally connected members; a foot section made up of crossed pivotally connected members; an intermediate section comprising laterally separable parts; a roller journaled on one of said parts; a flexible seat extended between the roller and the other of said parts, each of said parts of the intermediate section being pivoted at its ends to one handle forming member and one foot forming member, whereby when the parts of the intermediate section are brought together, the handle forming section, the intermediate section and the foot section may be disposed in axial alinement; and means for holding the sections rigidly in axial alinement.

2. A combined walking cane and stool embodying a handle section made up of crossed pivotally connected members; a foot section made up of crossed pivotally connected members; an intermediate section comprising laterally separable parts; a roller journaled on one of said parts; a flexible seat extended between the roller and the other of said parts, each of said parts of the intermediate section being pivoted at its ends to one handle forming member and one foot forming member, whereby when the parts of the intermediate section are brought together, the handle forming section, the intermediate section and the foot section may be disposed in axial alinement; and pivotally mounted braces forming detachable connections between certain of the crossed, pivotally connected members and one part of the intermediate section, when the structure is disposed in the form of a stool, and when the structure is disposed in the form of a cane.

3. A combined walking cane and stool embodying a handle section made up of crossed pivotally connected members; a foot section made up of crossed pivotally connected members; an intermediate section comprising laterally separable parts; a roller journaled on one of said parts; a flexible seat extended between the roller and the other of said parts, each of said parts of the intermediate section being pivoted at its ends to one handle forming member and one foot forming member, whereby when the parts of the intermediate section are brought together, the handle forming section, the intermediate section and the foot section may be disposed in axial alinement; and pivotally mounted braces forming detachable connections between certain of the crossed, pivotally connected members and one part of the intermediate section, when the structure is disposed in the form of a stool and when the structure is disposed in the form of a cane; and movable latches coacting with the braces when the structure is disposed in the form of a cane.

4. A combined walking cane and stool embodying a handle section made up of crossed pivotally connected members; a foot section made up of crossed pivotally connected members; an intermediate section comprising laterally separable parts; a flexible seat; means for connecting the ends of the flexible seat to the parts of the intermediate section; each of said parts of the intermediate section being pivoted at its ends to one handle forming member and one foot forming member, whereby when the parts of the intermediate section are brought together, the handle forming section, the intermediate section and the foot section may be disposed in axial alinement; and releasable means for holding the sections in axial alinement.

In testimony that I claim the foregoing as my own, I have hereto affixed my signature in the presence of two witnesses.

ARTHUR H. FRANKE.

Witnesses:
ROSE WANISH,
FRED. O. ANDERSON.

Copies of this patent may be obtained for five cents each, by addressing the "Commissioner of Patents Washington, D. C."